(12) United States Patent
Schaale et al.

(10) Patent No.: US 10,947,954 B2
(45) Date of Patent: Mar. 16, 2021

(54) SUPPORT SYSTEM FOR A SPINNER OF A ROTOR HUB FOR A WIND TURBINE

(71) Applicant: Nordex Energy SE & Co. KG, Hamburg (DE)

(72) Inventors: Thomas Schaale, Rostock (DE); Sebastian Baum, Rostock (DE)

(73) Assignee: Nordex Energy SE & Co. KG, Hamburg (DE)

( * ) Notice: Subject to any disclaimer, the term of this patent is extended or adjusted under 35 U.S.C. 154(b) by 0 days.

(21) Appl. No.: 16/434,651

(22) Filed: Jun. 7, 2019

(65) Prior Publication Data

US 2020/0003179 A1 Jan. 2, 2020

(30) Foreign Application Priority Data

Jun. 27, 2018 (EP) .................................... 18180149

(51) Int. Cl.
*F03D 1/06* (2006.01)

(52) U.S. Cl.
CPC .................................. *F03D 1/0691* (2013.01)

(58) Field of Classification Search
CPC ........ F03D 80/50; F03D 13/10; F03D 1/0658; F03D 80/00; F03D 80/80; F03D 1/065; F03D 13/20; F03D 1/0691; Y02E 10/721; Y02E 10/726; F01D 25/24; F05B 2240/916; F05B 2240/14; F05B 2230/60
See application file for complete search history.

(56) References Cited

U.S. PATENT DOCUMENTS

| 8,449,263 | B2 * | 5/2013 | Leland .................. F03D 1/0691 416/244 A |
| 2012/0134840 | A1 | 5/2012 | Leland |
| 2013/0302175 | A1 | 11/2013 | Munk-Hansen |
| 2015/0354233 | A1 | 12/2015 | Ebbesen et al. |

FOREIGN PATENT DOCUMENTS

DE  10 2014 200 386 A1  7/2014

* cited by examiner

*Primary Examiner* — Michael Lebentritt
*Assistant Examiner* — Eric J Zamora Alvarez
(74) *Attorney, Agent, or Firm* — Walter Ottesen, P.A.

(57) ABSTRACT

A support system for a spinner of a rotor hub for a wind turbine, in particular to the attachment of a spinner to the rotor hub. It is an object of the disclosure to provide a spinner for a wind turbine with a suitable support system. The support system should be inherently resistant to shear and should thereby reduce the stress on the spinner. A rotor hub of a wind turbine includes a spinner, wherein the rotor hub is connected mechanically to the spinner. The spinner includes at least three spinner components. A support system is provided via which two spinner components disposed in spaced relationship to each other are supported by the rotor hub in each case. A respective third spinner component is arranged between the two spinner components and is connected to the components.

8 Claims, 5 Drawing Sheets

SUPPORT SYSTEM FOR A SPINNER OF A ROTOR HUB FOR A WIND TURBINE

CROSS REFERENCE TO RELATED APPLICATION

This application claims priority of European patent application no. 18 180 149.9, filed Jun. 27, 2018, the entire content of which is incorporated herein by reference.

FIELD OF THE INVENTION

The present invention relates to a support system for a spinner of a rotor hub for a wind turbine, in particular to the attachment of a spinner to the rotor hub.

BACKGROUND OF THE INVENTION

A wind turbine usually includes a tower and a nacelle, which is mounted on the top of the tower in such a way as to be rotatable about the longitudinal axis of the tower. The nacelle supports the rotor with a rotor hub and at least one rotor blade as well as a generator, which converts the energy taken from the wind by the rotor into electric energy.

The "spinner" is a rotor hub casing. For the rotor blades provided on the rotor hub, the spinner has a rotor blade opening for each rotor blade, wherein the rotor blade openings are arranged in a uniformly distributed manner on the circumference of the spinner. A respective rotor blade connection in the rotor hub is accessible through each of the rotor blade openings. The spinner furthermore has a central shaft opening, in which the connection between the rotor hub and the drive train is made. In this arrangement, the shaft opening faces the nacelle of the wind turbine.

The stability of the spinner is particularly significant for wind turbines and the use conditions thereof. The support system of the spinner is often constructed from individual rod elements (U profile; L profiles; tubes etc.) The spinner is likewise often assembled from three to four parts, which are connected to one another and to the support system.

DE 102014200386 A1 discloses a hub and the casing thereof of a wind turbine. The casing is connected to the hub and includes three casing plates, which each have three connecting parts. One connecting part secures the hub between two blade bearing connecting flanges, while the other two connecting parts are each connected to the two other casing plates. Three bent holders are connected by their respective two end parts to the hub and by their central part to two adjacent casing plates in each case.

US 2012/0134840 A1 shows a rotor hub arrangement having a hub housing including a multiplicity of housing segments, wherein the inner hub is assembled from a plurality of hub segments. In addition, a plurality of beam-type support elements is arranged between the inner hub and the hub housing. The support elements are connected to the housing segments by welded-on fastening ribs and are coupled to the hub segments via suitable fastening elements (e.g. bolts, screws, rivets and/or the like). The support elements can be formed from a suitable metal and/or from some other suitable rigid and/or semirigid material.

The publications US 2013/0302175 A1 and US 2015/0354233 A1 disclose platforms for maintenance personnel in a rotor for a wind turbine. The platforms are fastened on the hub of the rotor and/or on an inner surface of the rotor housing with a fastening system.

SUMMARY OF THE INVENTION

It is an object of the invention to provide a spinner for a wind turbine with a suitable support system. The support system should be inherently resistant to shear and should thereby reduce the stress on the spinner.

The object can, for example, be achieved via a support system for a spinner of a rotor hub for a wind turbine. The system includes: a spinner including at least three spinner components including a first spinner component, a second spinner component and a third spinner component; a rotor hub mechanically connected to the spinner; the first spinner component and the second spinner component being disposed in spaced relationship to each other; a support supporting the first spinner component and the second spinner component; the third spinner component being arranged between the first spinner component and the second spinner component and being connected to the first spinner component and the second spinner component.

The solution relates to the attachment of a spinner to a rotor hub and relates to a support system for the spinner. A rotor hub of a wind turbine includes a spinner, wherein the rotor hub is connected mechanically to the spinner. The spinner includes at least three spinner components. According to the invention, a support system is provided via which two spinner components that are not directly adjacent are supported by the rotor hub in each case. A respective third spinner component is arranged between the two spinner components and is connected to the components.

In an embodiment, the support system includes windward side front support elements on a front side of the rotor hub and leeward side rear support struts arranged between the rotor hub and the spinner. The rear support struts are arranged on a side of the rotor hub which faces the nacelle, which has a central shaft opening, and the front support elements are arranged on that side of the rotor hub which lies opposite the central shaft opening.

Another embodiment is distinguished by the fact that the front support element includes a rod element and a sheet-metal part. One or more front support elements can be provided. The sheet-metal part is a support plate having the shape of an isosceles trapezium, wherein two side walls of the sheet-metal part are angled through 90°. The side walls are longer than the sides of the trapezium, with the result that they project beyond an upper wall of the support plate. A lower wall is arranged opposite the upper wall of the support plate and is angled away from the support plate. In one embodiment, the angle between the support plate and the lower wall is 139°.

In another embodiment, the front support elements have, in the extended side walls thereof, openings in which a tubular or bar-shaped rod element is arranged. The rod element is connected to the spinner components via fastening brackets. The front support elements are secured by the lower wall on the rotor hub.

In another embodiment, a connecting element connects two front support elements releasably to one another in that a rod element of one front support element is connected to the first end of the connecting element, and the rod element of the second front support element is connected to the second end of the connecting element. The fastening brackets of the rod elements of the front support elements are connected to fastening brackets, which are arranged on the ends of the connecting elements, and to the spinner components.

In another embodiment, the rear support strut includes an elongate plate angled through 90° on a short side. At least one web, situated on the longitudinal side, is arranged centrally on the plate. The short, angled side is connected to the rotor hub, and that end of the rear support strut which lies opposite the angled side is connected to the spinner components.

The support system can be attached to the spinner components at the flanges of the spinner components. There is no need to transmit large bending moments. The production of the spinner components is significantly simplified since there is no need to position any flat reflections or threaded bushes.

The pitch of the spinner components has the effect that the dimensions of the spinner components can be embodied in such a way that transport widths of less than 3 m can be achieved and stackability can be significantly enhanced.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
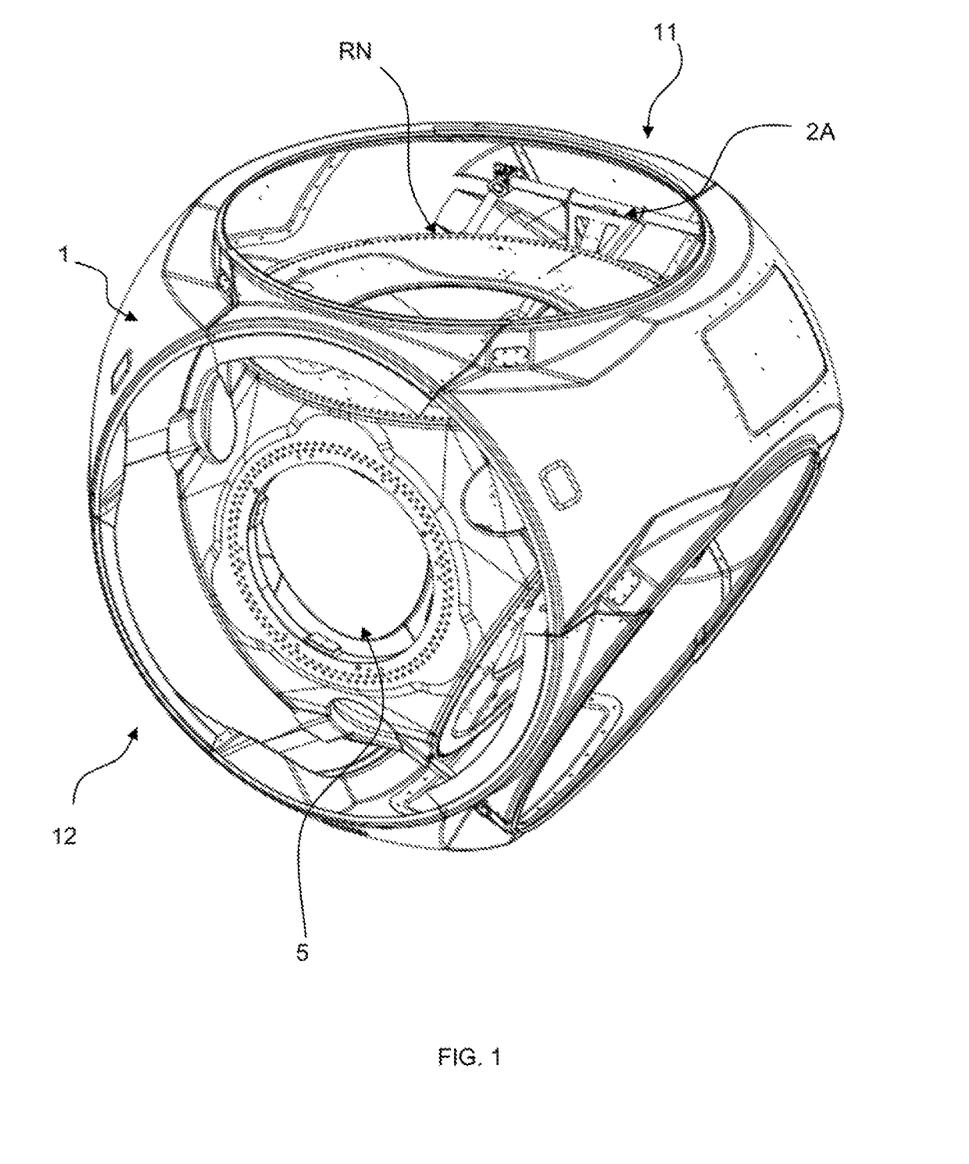
FIG. 1 shows a schematic illustration of a rotor hub having a spinner and a support system according to an embodiment of the invention.

FIG. 1 shows a schematic illustration of a rotor hub RN of a wind turbine having a spinner 1 and a support system 2 according to the invention. On the rotor hub RN, the side shown in FIG. 1 is the rear side 12, which faces the nacelle and, on the leeward side, has a central shaft opening 5. The side of the rotor hub RN and of the spinner 1 which is referred to as the front side 11, also as the windward side, is situated opposite the central shaft opening 5. The support system includes three identical front support elements 2A and three connecting elements 4 on the front side 11 of the spinner 1 and six rear support struts 2B on the rear side 12 of the spinner 1. In this embodiment, the spinner 1 is divided into more than three spinner components 13, advantageously into six to nine spinner components 13. However, it is also possible for more than nine spinner components 13 to be provided. The support system 2 is inherently resistant to shear and thereby reduces the stress on the spinner 1.

Figure 2:
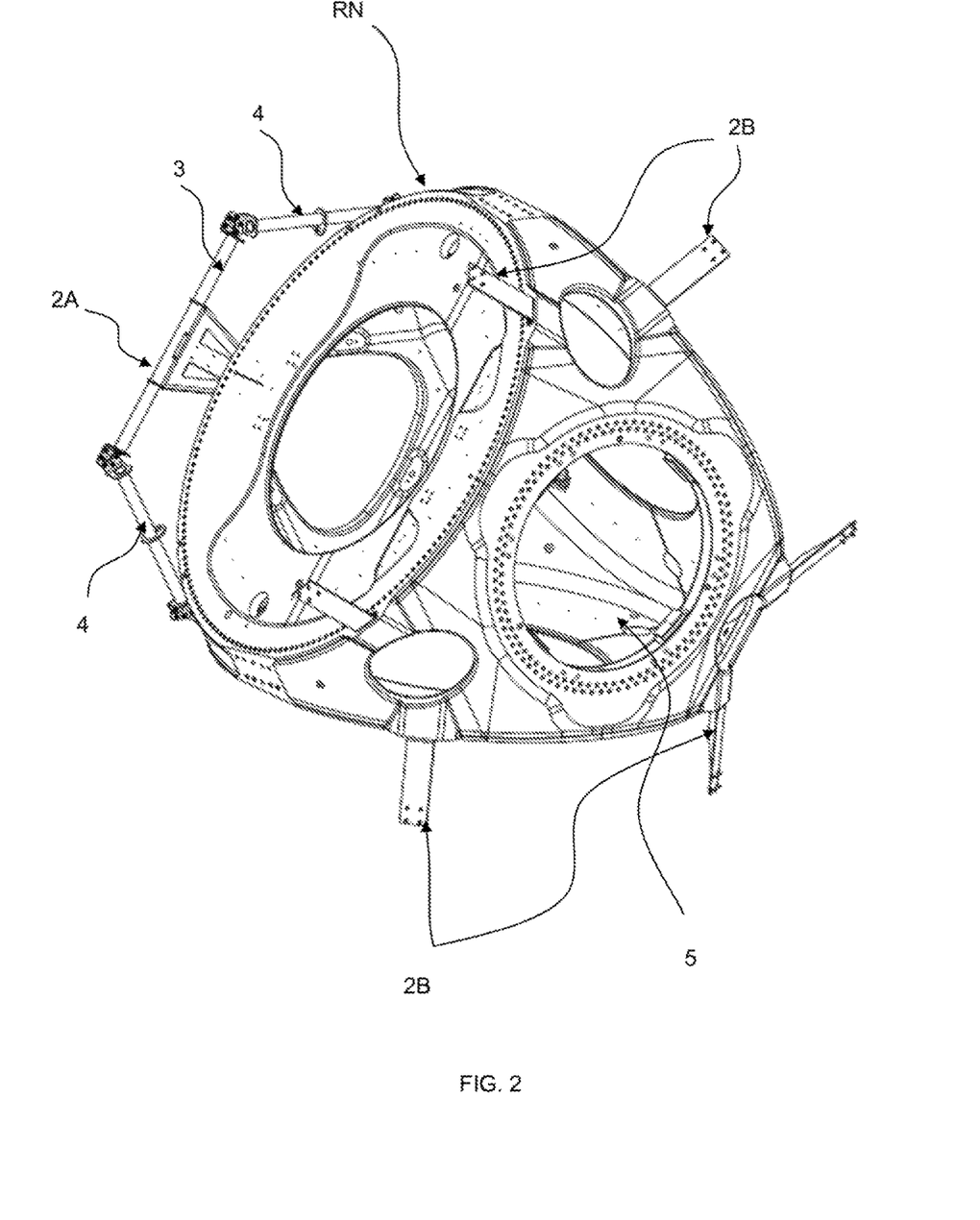
FIG. 2 shows a schematic illustration of a rotor hub having a plurality of front support elements (only one support element being visible) and a plurality of rear support struts.

FIG. 2 shows a schematic illustration of the rotor hub RN with the arrangement of a front support element 2A and a plurality of rear support struts 2B without a spinner. In general, three front support elements 2A are connected to the rotor hub RN. These three front support elements 2A are connected releasably to one another via tubular or bar-shaped connecting elements 4. A connecting element 4 of this kind is shown in greater detail in FIG. 6.

Figure 3:
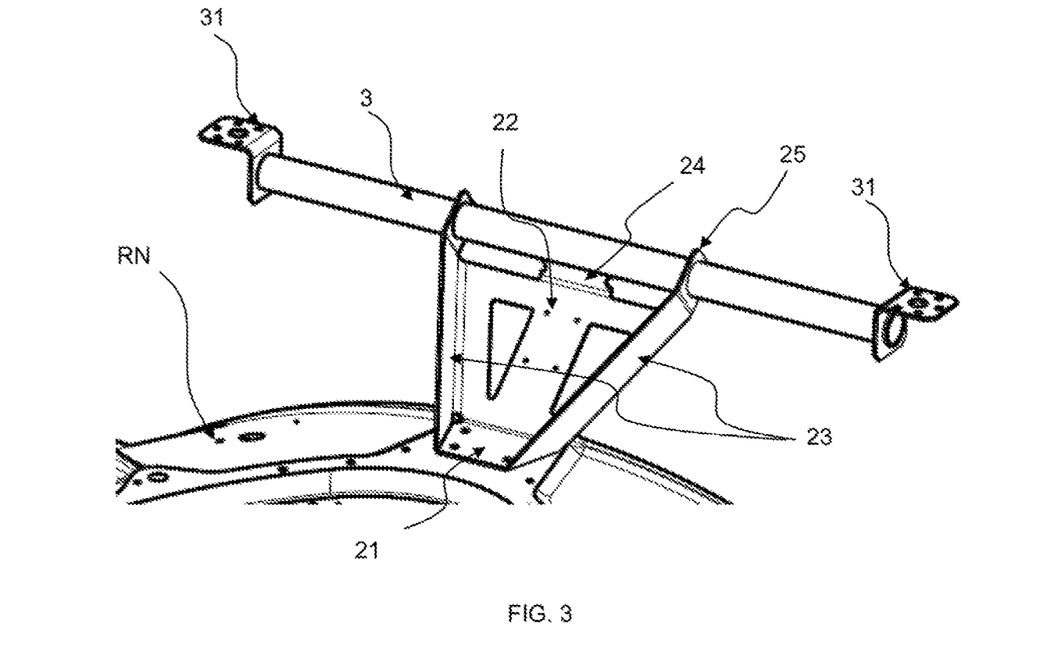
FIG. 3 shows a front support element.

FIG. 3 shows a front support element 2A, which is connected to the rotor hub RN. The support system 2 is attached to the rotor hub RN, e.g. by screw fastening, at lugs specially provided for this purpose or at interfaces with the rotor shaft/blade bearings. The front support element 2A includes a support plate 20, which is bent on three sides, and a rod element 3. Basically, the support plate 20 has the shape of an isosceles trapezium with a base 22, two side walls 23, a lower wall 21 and an upper wall 24. The lower wall 21 is secured on the rotor hub RN. The two side walls 23 of the support plate 20 are bent through 90° relative to the base 22 in one direction, ensuring that the front support element 2A is inherently sufficiently stable. The side walls 23 project beyond the upper wall 24 and each merge into a tab-shaped receptacle 25 for the rod element 3. For their part, the tab-shaped receptacles 25 are bent in such a way that they are parallel to one another and can receive the rod element 3 in openings 26 provided for this purpose. The rod element 3 is additionally connected firmly to the upper wall 24. The angle between the lower wall 21 and the base 22 of the front support element 2A is at least 90°. At its ends, the rod element 3 is provided with fastening brackets 31, on which the spinner components 13 are secured.

Figure 4:
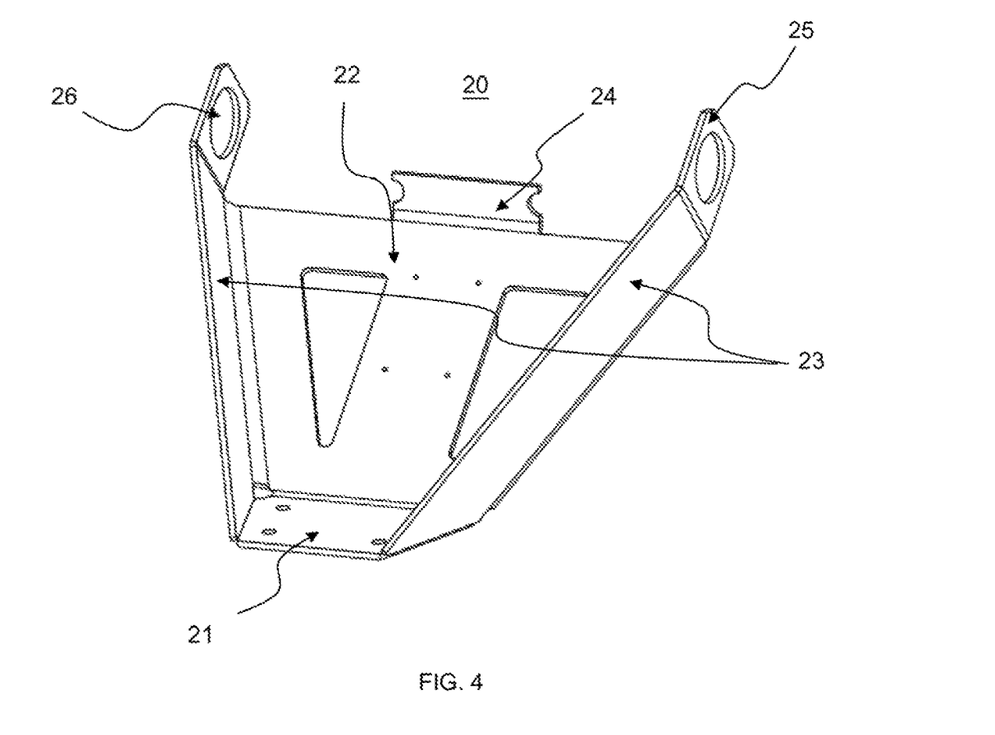
FIG. 4 shows a support plate of the front support element.

FIG. 4 once again shows the support plate 20 of the front support element 2A with the base 22, the two side walls 23, the lower wall 21 and the upper wall 24 without the rod element 3.

Figure 5:
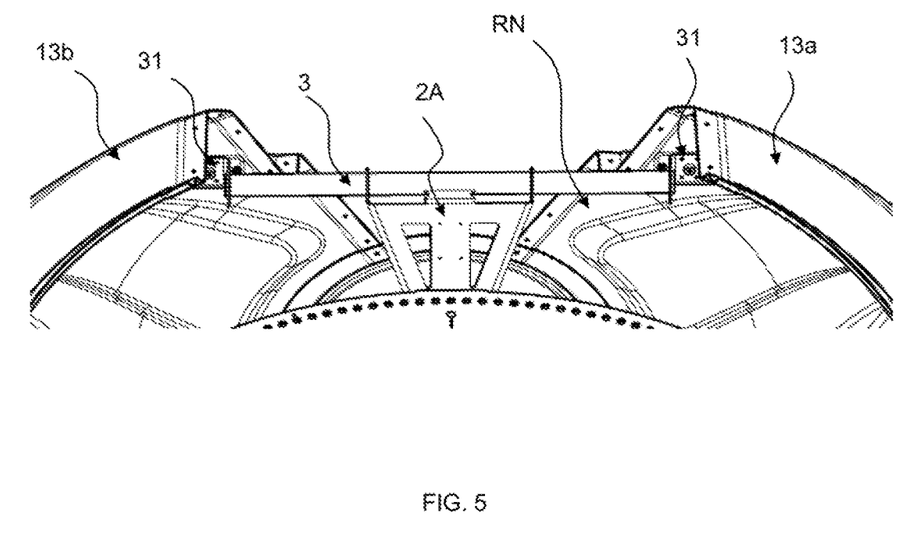
FIG. 5 shows a front support element with a spinner.

FIG. 5 shows the front support element 2A and the spinner 1. The spinner 1 is divided into segments, giving the spinner components 13. FIG. 5 furthermore shows that two spinner components 13 are provided, wherein a right-hand spinner component 13a is connected to the right-hand fastening bracket 31 of the front support element 2A and a left-hand spinner component 13b is connected to the left-hand fastening bracket 31 of the front support element 2A. Another spinner component 13 is inserted between the right-hand spinner component 13a and the left-hand spinner component 13b. This spinner component 13 is connected to both the other spinner components 13a and 13b. The connection can be a screwed joint or a clamped joint, for example. The front support element 2A is attached to the spinner components 13 with the aid of laminated-in threaded bushes or by clamping the spinner components 13 via a separate metal plate (not shown here), for example. For this purpose, the threaded bushes must be positioned during the production of the components, or flat surfaces for clamping must be provided. The loads are accepted by the support system 2.

Figure 6:
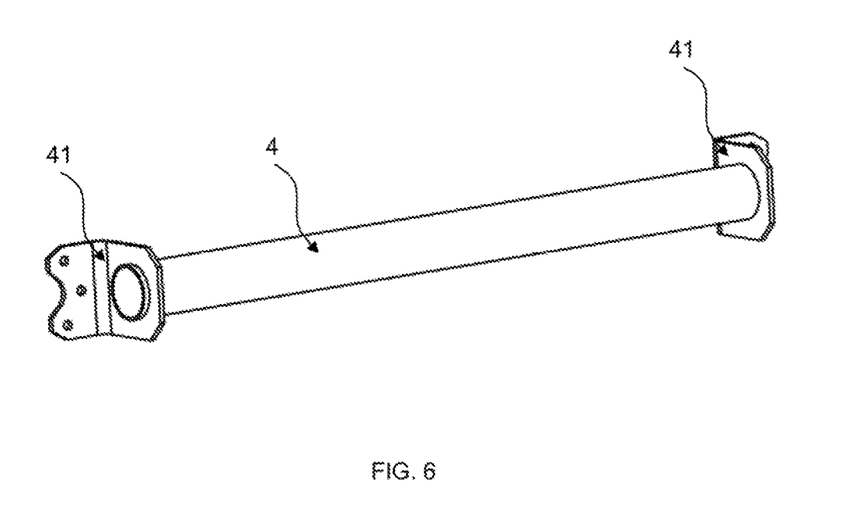
FIG. 6 shows a connecting element between the front support elements.

FIG. 6 shows a connecting element 4. The connecting element 4 includes a tube or rod. The tube or rod is connected at each of the two ends to a respective fastening bracket 41. The fastening brackets 41 are used for fastening to the spinner components 13. Moreover, a respective fastening bracket 41 of the connecting element 4 is connected releasably to a respective fastening bracket 31 of the rod element 3 of a front support element 2A, with the result that in each case two front support elements 2A are connected to one another by one connecting element 4.

Figure 7:
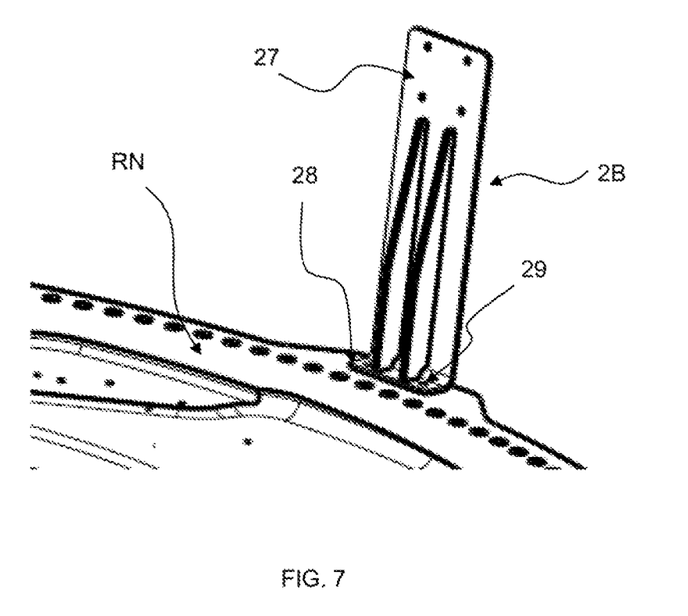
FIG. 7 shows a rear support strut.

FIG. 7 shows a rear support strut 2B. In contrast to the front support element 2A, the rear support strut 2B includes only an elongate plate angled through 90° on one of the two short sides 28 and having at least one central web, situated on the longitudinal side, for stabilization. Two central parallel webs 27 are shown in FIG. 7. The short, angled side 28 has holes 29, through which the rear support strut 2B is screwed to the rotor hub RN. The opposite end of the rear support strut 2B is connected to the spinner components 13.

Figure 8:
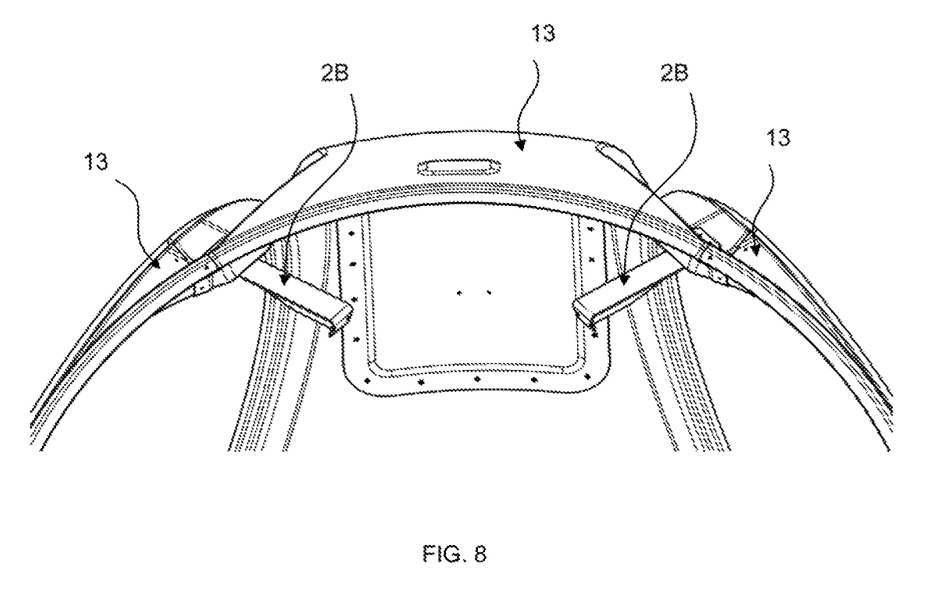
FIG. 8 shows two rear support struts and the spinner.

FIG. 8 shows two rear support struts 2B and the spinner 1. The rear support struts 2B are secured at an angle greater than 90° while sloping away from one another. FIG. 8 furthermore shows that three spinner components 13 are provided here, wherein a right-hand spinner component 13a is connected to the right-hand rear support strut 2B and a left-hand spinner component 13b is connected to the left-hand rear support strut 2B. A further spinner component 13c is inserted between the right-hand spinner component 13a and the left-hand spinner component 13b, wherein the connection to the right-hand spinner component 13a and the left-hand spinner component 13b is made by screw fastening or via a clamped connection.

Since the above support system 2 which has been described in detail is a matter of exemplary embodiments, these can be modified within a wide range in the usual way by a person skilled in the art without exceeding the scope of the invention. In particular, the specific embodiments of the support system 2 can take forms other than those described here. The support system 2 can likewise be embodied in a different form if this is necessary for reasons of space or for design reasons.

It is understood that the foregoing description is that of the preferred embodiments of the invention and that various changes and modifications may be made thereto without departing from the spirit and scope of the invention as defined in the appended claims.

REFERENCE NUMERALS

RN rotor hub
1 spinner
11 front side (windward side) of the rotor hub RN and of the spinner 1
12 rear side (leeward side) of the rotor hub RN and of the spinner 1
13 spinner component
13a right-hand spinner component
13b left-hand spinner component
2 support system
2A front support element
20 support plate
21 lower wall
22 base
23 side walls
24 upper wall
25 tab-shaped receptacle
26 openings
2B rear support strut
27 web of the rear support strut 2B
28 short, angled side of the rear support strut 2B
29 holes
3 rod element
31 fastening bracket on the rod element 3
4 connecting element
41 fastening bracket on the connecting element 4
5 central shaft opening

What is claimed is:

1. A support system for a spinner of a rotor hub for a wind turbine, the support system comprising:
a spinner body including at least three spinner components including a first spinner component, a second spinner component and a third spinner component;
the rotor hub being mechanically connected to said spinner body;
said first spinner component and said second spinner component being disposed in a spaced relationship to each other;
said support system supporting said first spinner component and said second spinner component;
said third spinner component being arranged between said first spinner component and said second spinner component and being connected to said first spinner component and said second spinner component;
the support system defining a windward side and a leeward side;
the wind turbine including a nacelle;
said support system including, on said windward side, a front support element arranged on a front side between said rotor hub and said spinner body;
said support system including, on said leeward side, a rear support strut arranged on a side of said rotor hub facing said nacelle between said rotor hub and said spinner body;
a side of said rotor hub facing said nacelle defining a central shaft opening;
said front support element including a rod element and a sheet-metal part;
said sheet-metal part being a support plate having a shape of an isosceles trapezium;
said sheet-metal part including two side walls angled by 90°;
said trapezium defining sides;
said support plate having a lower wall and an upper wall;
said side walls being longer than said sides of said trapezium such that said side walls project beyond said upper wall of said support plate; and,
said lower wall being arranged opposite said upper wall of said support plate and being angled away from said support plate.

2. The support system of claim 1, wherein said support plate and said lower wall conjointly define an angle between 110° and 150°.

3. The support system of claim 1 further comprising:
a plurality of fastening brackets;
said front support element defining an opening in each of said side walls;
said rod element being disposed in said openings; and,
said rod element being connected to said spinner components via said fastening brackets.

4. The support system of claim 1, wherein said front support element is fixed on said rotor hub with said upper wall.

5. A support system for a spinner of a rotor hub for a wind turbine, the support system comprising:
a spinner body including at least three spinner components including a first spinner component, a second spinner component and a third spinner component;
the rotor hub being mechanically connected to said spinner body;
said first spinner component and said second spinner component being disposed in a spaced relationship to each other;
said support system supporting said first spinner component and said second spinner component;
said third spinner component being arranged between said first spinner component and said second spinner component and being connected to said first spinner component and said second spinner component;
the support system defining a windward side and a leeward side;
the wind turbine including a nacelle;
said support system including, on said windward side, a front support element arranged on a front side between said rotor hub and said spinner body;
said support system including, on said leeward side, a rear support strut arranged on a side of said rotor hub facing said nacelle between said rotor hub and said spinner body;
a side of said rotor hub facing said nacelle defining a central shaft opening;

wherein said front support element is a first front support element having a first rod element;
a second front support element having a second rod element;
a connecting element releasably interconnecting said first front support element and said second front support element;
said connecting element having a first end connected to said first rod element of said first front support element and a second end connected to said second rod element of said second front support element;
a plurality of first brackets;
said connecting element defining two ends and having a second bracket disposed at each of said two ends;
said first rod element and said second rod element each being connected to corresponding ones of said first spinner component, said second spinner component, and said third spinner component via respective ones of said first brackets; and,
said second brackets of said connecting element each being directly connected on a corresponding one of said first brackets and a corresponding one of said first spinner component, said second spinner component, and said third spinner component.

6. A support system for a spinner of a rotor hub for a wind turbine, the support system comprising:
a spinner body including at least three spinner components including a first spinner component, a second spinner component and a third spinner component;
the rotor hub being mechanically connected to said spinner body;
said first spinner component and said second spinner component being disposed in a spaced relationship to each other;
said support system supporting said first spinner component and said second spinner component;
said third spinner component being arranged between said first spinner component and said second spinner component and being connected to said first spinner component and said second spinner component;
the support system defining a windward side and a leeward side;
the wind turbine including a nacelle;
said support system including, on said windward side, a front support element arranged on a front side between said rotor hub and said spinner body;
said support system including, on said leeward side, a rear support strut arranged on a side of said rotor hub facing said nacelle between said rotor hub and said spinner body;
a side of said rotor hub facing said nacelle defining a central shaft opening;
said rear support strut includes an elongate plate angled by 90° on a short, angled side of said rear support strut;
said rear support strut defines a longitudinal side;
said rear support strut further includes at least one web disposed on said longitudinal side and arranged centrally on said elongate plate;
said rear support strut has said short, angled side connected to said rotor hub; and,
said rear support strut has an end lying opposite said short, angled side and is connected to a corresponding one of said first spinner component, said second spinner component, and said third spinner component, wherein said longitudinal side defines a plane angled 90 degrees with respect to said elongate plate.

7. A support system for a spinner of a rotor hub for a wind turbine, the support system comprising:
a spinner body including at least three spinner components including a first spinner component, a second spinner component and a third spinner component;
a rotor hub mechanically connected to said spinner body;
said first spinner component and said second spinner component being disposed in a spaced relationship to each other;
said support system supporting said first spinner component and said second spinner component;
said third spinner component being arranged between said first spinner component and said second spinner component and being connected to said first spinner component and said second spinner component;
the support system defining a windward side and a leeward side;
the wind turbine including a nacelle;
said support system including, on said windward side, a front support element arranged on a front side between said rotor hub and said spinner body;
said support system including, on said leeward side, a rear support strut arranged on a side of said rotor hub facing said nacelle between said rotor hub and said spinner body;
a side of said rotor hub facing said nacelle defining a central shaft opening;
said front support elements each including a rod element and a sheet-metal part;
said sheet-metal part being a support plate having a shape of an isosceles trapezium;
said sheet-metal part including two side walls angled by 90°;
said trapezium defining sides;
said support plate having a lower wall and an upper wall;
said side walls being longer than said sides of said trapezium such that said side walls project beyond said upper wall of said support plate; and,
said lower wall being arranged opposite said upper wall of said support plate and being angled away from said support plate;
said rear support strut includes an elongate plate angled by 90° on a short, angled side of said rear support strut;
said rear support strut defines a longitudinal side;
said rear support strut further includes at least one web disposed on said longitudinal side and arranged centrally on said elongate plate;
said rear support strut has said short, angled side connected to said rotor hub; and
said rear support strut has an end lying opposite said short, angled side and is connected to a corresponding one of said first spinner component, said second spinner component, and said third spinner component, wherein said longitudinal side defines a plane angled 90 degrees with respect to said elongate plate, and,
wherein said support system includes a plurality of front support elements and a plurality of rear support struts.

8. A support system for a spinner of a rotor hub for a wind turbine having a nacelle, the spinner including at least three spinner components including a first spinner component, a second spinner component and a third spinner component, the rotor hub being mechanically connected to the spinner, the first spinner component and the second spinner component being disposed in a spaced relationship to each other, the third spinner component being arranged between the first spinner component and the second spinner component and being connected to the first spinner component and the second spinner component, the support system comprising:
- a support supporting the first spinner component and the second spinner component;
- the support system defining a windward side and a leeward side;
- said support includes, on said windward side, a front support element arranged on a front side between the rotor hub and the spinner;
- said front support element including a rod element and a sheet-metal part;
- said sheet-metal part being a support plate having a shape of an isosceles trapezium;
- said support plate having a lower wall and an upper wall;
- said sheet-metal part including two side walls angled by 90°;
- said side walls being longer than said sides of said trapezium such that said side walls project beyond said upper wall of said support plate; and,
- said lower wall being arranged opposite said upper wall of said support plate and being angled away from said support plate; and,
- said support includes, on said leeward side, a rear support strut arranged on a side of the rotor hub facing the nacelle between the rotor hub and the spinner.

* * * * *